United States Patent
Klimov

(10) Patent No.: US 12,130,694 B2
(45) Date of Patent: Oct. 29, 2024

(54) OPERATING QUANTUM DEVICES USING A TEMPORAL METRIC

(71) Applicant: Google LLC, Mountain View, CA (US)

(72) Inventor: Paul Victor Klimov, Santa Barbara, CA (US)

(73) Assignee: GOOGLE LLC, Mountain View, CA (US)

( * ) Notice: Subject to any disclaimer, the term of this patent is extended or adjusted under 35 U.S.C. 154(b) by 112 days.

(21) Appl. No.: 17/941,365

(22) Filed: Sep. 9, 2022

(65) Prior Publication Data

US 2023/0081120 A1 Mar. 16, 2023

Related U.S. Application Data

(60) Provisional application No. 63/243,427, filed on Sep. 13, 2021.

(51) Int. Cl.
| | |
|---|---|
| *G06F 3/06* | (2006.01) |
| *G06F 11/07* | (2006.01) |
| *G06F 11/10* | (2006.01) |
| *G06N 10/60* | (2022.01) |

(52) U.S. Cl.
CPC ...... *G06F 11/0751* (2013.01); *G06F 11/0721* (2013.01); *G06N 10/60* (2022.01)

(58) Field of Classification Search
CPC .. G06F 11/0751; G06F 11/0721; G06N 10/60
See application file for complete search history.

(56) References Cited

U.S. PATENT DOCUMENTS

| | | | |
|---|---|---|---|
| 11,361,241 B2 | 6/2022 | Klimov et al. | |
| 2018/0054201 A1* | 2/2018 | Reagor | H03K 19/195 |
| 2020/0387822 A1 | 12/2020 | Klimov | |
| 2021/0334689 A1 | 10/2021 | Klimov et al. | |
| 2023/0094389 A1* | 3/2023 | You | G06N 5/01 |
| | | | 706/62 |
| 2023/0394342 A1* | 12/2023 | Bloom | G06N 10/40 |

OTHER PUBLICATIONS

Gong et al., "Quantum walks on a programmable two-dimensional 62-qubit superconducting processor", arXiv.2102.02573v3, dated Jul. 21, 2021, 34 pages.
International Search Report and Written Opinion for Application No. PCT/US2022/042627, mailed Nov. 15, 2023, 12 pages.
(Continued)

*Primary Examiner* — Guy J Lamarre
(74) *Attorney, Agent, or Firm* — DORITY & MANNING P.A.

(57) ABSTRACT

Systems and methods for operating one or more qubits in a quantum computing system are provided. In some examples, a method can include obtaining past time data associated with a temporal metric of an operating parameter of a qubit in a quantum device. The method can include selecting an operating parameter value based at least in part on the past time data associated with the temporal metric of the operating parameter to reduce likelihood of occurrence of a time dependent defect. The time dependent defect can exhibit a time dependent behavior. The method can include operating the qubit in the quantum device at the operating parameter value.

20 Claims, 10 Drawing Sheets

(56) References Cited

OTHER PUBLICATIONS

Kilmov et al., "Fluctuations of Energy-Relaxation Times in Superconducting Qubits", arXiv:1809.01043v1 [quant-ph], Sep. 4, 2018, 21 pages.
Kilmov et al., "The Snake Optimizer for Learning Quantum Processor Control Parameters", arXiv:2006.04594v1 [quant-ph], Jun. 8, 2020, 7 pages.
International Preliminary Report on Patentability for Application No. PCT/US2022/042627, mailed Mar. 28, 2024, 8 pages.

* cited by examiner

OPERATING QUANTUM DEVICES USING A TEMPORAL METRIC

PRIORITY CLAIM

The present application claims the benefit of priority of U.S. Provisional Application Ser. No. 63/243,427, titled "Operating Quantum Devices Using a Temporal Metric," filed on Sep. 13, 2021, which is incorporated herein by reference.

FIELD

The present disclosure relates generally to quantum computing systems.

BACKGROUND

Quantum computing is a computing method that takes advantage of quantum effects, such as superposition of basis states and entanglement to perform certain computations more efficiently than a classical digital computer. In contrast to a digital computer, which stores and manipulates information in the form of bits, e.g., a "1" or "0," quantum computing systems can manipulate information using quantum bits ("qubits"). A qubit can refer to a quantum device that enables the superposition of multiple states, e.g., data in both the "0" and "1" state, and/or to the superposition of data, itself, in the multiple states. In accordance with conventional terminology, the superposition of a "0" and "1" state in a quantum system may be represented, e.g., as a $|0\rangle+b|1\rangle$ The "0" and "1" states of a digital computer are analogous to the $|0\rangle$ and $|1\rangle$ basis states, respectively of a qubit.

SUMMARY

Aspects and advantages of embodiments of the present disclosure will be set forth in part in the following description, or can be learned from the description, or can be learned through practice of the embodiments.

One example aspect of the present disclosure is directed to a method of operating a qubit in a quantum device. The method can include obtaining past time data associated with a temporal metric of an operating parameter of a qubit in a quantum device. The method can include selecting an operating parameter value based at least in part on the past time data associated with the temporal metric of the operating parameter to reduce likelihood of occurrence of a time dependent defect. The time dependent defect can exhibit a time dependent behavior. The method can include operating the qubit in the quantum device at the operating parameter value.

Other aspects of the present disclosure are directed to various systems, methods, apparatuses, non-transitory computer-readable media, computer-readable instructions, and computing devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
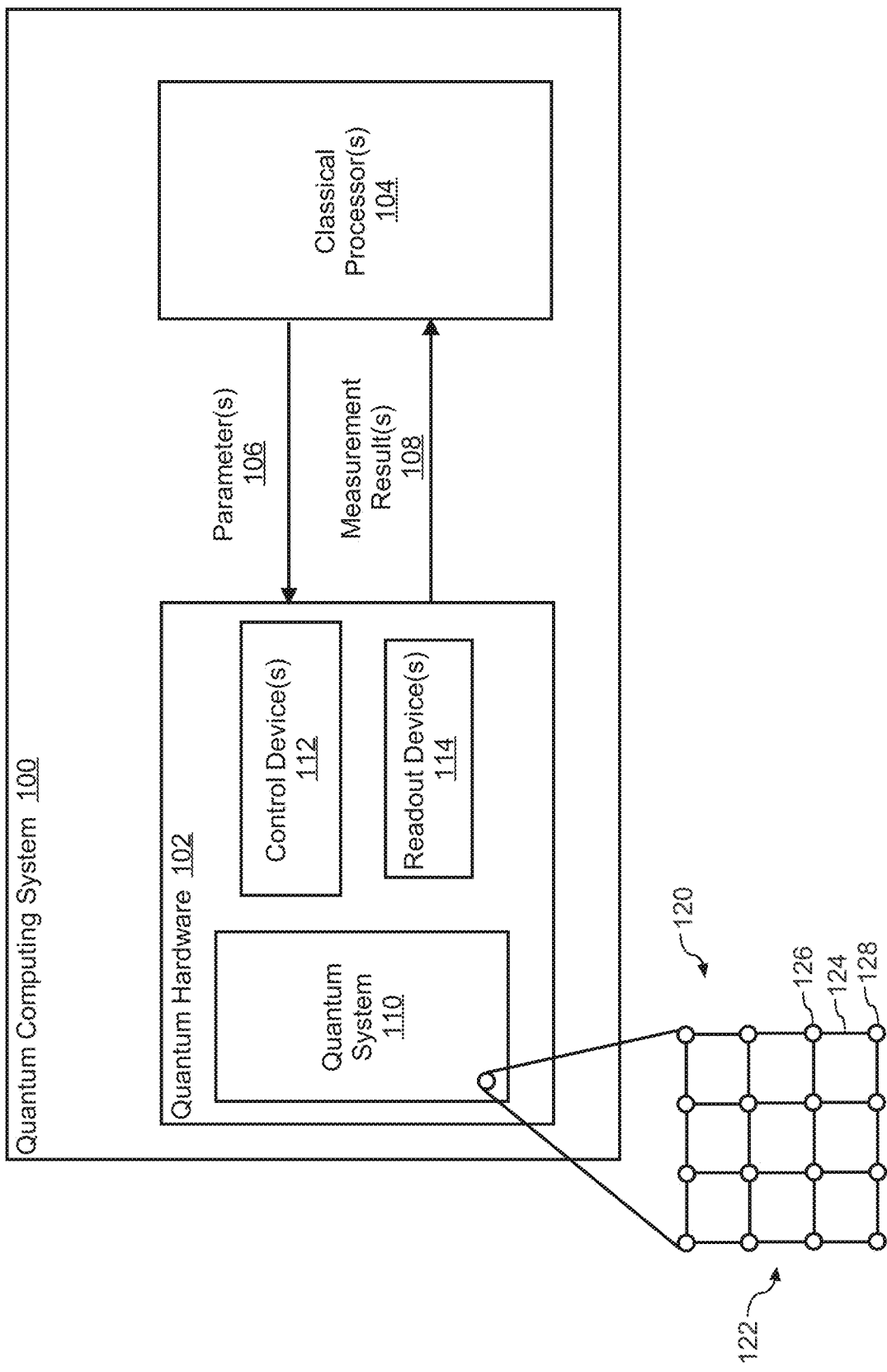
FIG. 1 depicts an example quantum computing system according to example embodiments of the present disclosure.

Example aspects of the present disclosure are directed to systems and methods for operating qubits in a quantum computing system. One problem with operating quantum devices is that qubits can decohere (e.g., diphase and/or transition states undesirably). Decoherence occurring before completing a calculation can lead to errors.

For instance, quantum computing devices can include a quantum processor(s) having a plurality of qubits (e.g., superconducting qubits). Each qubit can be operated according to an operating parameter. The effectiveness of the operating parameter can be dependent on a temporal metric (e.g., the metric can vary over time). The temporal metric can vary as a function of the operating parameter and can vary over time. In some cases, the temporal metric can be associated with time dependent material defects resulting from, for instance, colliding or coinciding with defects, such as two-level-system (TLS) defects in the materials used to implement the plurality of qubits.

For example, a quantum processor(s) can include a plurality of qubits arranged, for instance, in a two-dimensional grid, where neighboring qubits are allowed to interact. Each qubit can be operated using respective operating frequencies (e.g., respective idling frequency and/or interaction frequencies and/or readout frequencies and/or reset frequencies). The operating frequencies can vary from qubit to qubit (e.g., each qubit can idle at a different operating frequency).

Some operating frequencies are better than other operating frequencies. A temporal metric for assessing a particular operating frequency for a qubit can be energy relaxation time for the operating frequency. Lower energy relaxation times can lead to larger quantum computational errors, so it can be desirable to operate qubits at frequencies where energy relaxation time is high.

However, qubit energy relaxation times can fluctuate by orders of magnitude based on operating frequency and based on time. In this regard, time based fluctuations in energy relaxation times can present an obstacle for scaling quantum computers. Some fluctuations in energy relaxation times can be caused by transitions of material two-level-system defects colliding (e.g., moving into and out of resonance) or coinciding with qubit transitions. In some cases, the fluctuations can exhibit telegraphic behavior, in which the defect moves between multiple discrete states. Alternatively, the fluctuations may exhibit diffusive behavior, in which the defect drifts semi-continuously. In yet another form, the defect might exhibit some of each of the telegraphic and diffusive behaviors.

In frequency tunable qubit architectures, two-level-system defects can be reduced by optimizing frequencies at which single-qubit gates, multi-qubit gates, reset and readout happen. However, this optimization of frequencies does not account for the time dependent behavior of the temporal metric (e.g., energy relaxation time) and associated time dependent defects, such as the time dependence of colliding with two-level-system transitions.

Aspects of the present disclosure describe systems and methods that leverage past time data to predict and avoid future defects. Past time data can be used to implement constraints in selecting operating parameters for qubits. These constraints can reduce the likelihood of determining operating parameters for operation of the qubits that coincide with time dependent defects.

For example, in some embodiments, a cost function can be constructed that is a sum of weighted cost terms. At least one of the weighted cost terms can be associated with the past time data to implement the constraint. The cost function can be optimized or otherwise used to select an operating parameter value for the operating parameter. The quantum device can be operated at the determined operating parameter for the qubit(s) to improve performance and reduce the occurrence of errors due to defects.

In some implementations, the cost function can include a cost term such that the cost function embeds a past defect state into the cost function. This approach might be suitable for a telegraphic defect. In some embodiments, the cost function can include a cost term that embeds a future predicted defect state into the cost function. The future predicted defect state can be extrapolated from past time data. This extrapolation could be accomplished with, for example, a polynomial fit or a machine-learned model (e.g., implemented using a neural network). This might be appropriate for a defect exhibiting diffusive behavior. A hybrid approach using cost terms associated with both a past defect state and a future predicted defect state extrapolated from past time data might be appropriate for other cases, such as defects exhibiting both telegraphic and diffusive behavior.

The systems and methods according to example aspects of the present disclosure can have a number of technical effects and benefits. For instance, quantum computing devices operated according to example aspects of the present disclosure may perform computations with fewer errors and increased accuracy. In addition, the reduction in errors can provide for increased coherency of the quantum computing system and the ability to scale the quantum computing system to include an increased number of qubits.

With reference now to the FIGS., example embodiments of the present disclosure will be discussed in further detail. As used here, the use of the term "about" in conjunction with a value refers to within 20% of the value.

FIG. 1 depicts an example quantum computing system 100. The system 100 is an example of a system of one or more classical computers and/or quantum computing devices in one or more locations, in which the systems, components, and techniques described below can be implemented. Those of ordinary skill in the art, using the disclosures provided herein, will understand that other quantum computing devices or systems can be used without deviating from the scope of the present disclosure.

The system 100 includes quantum hardware 102 in data communication with one or more classical processors 104. The classical processors 104 can be configured to execute computer-readable instructions stored in one or more memory devices to perform operations, such as any of the operations described herein. The quantum hardware 102 includes components for performing quantum computation. For example, the quantum hardware 102 includes a quantum system 110, control device(s) 112, and readout device(s) 114 (e.g., readout resonator(s)). The quantum system 110 can include one or more multi-level quantum subsystems, such as a register of qubits (e.g., qubits 120). In some implementations, the multi-level quantum subsystems can include superconducting qubits, such as flux qubits, charge qubits, transmon qubits, gmon qubits, etc.

The type of multi-level quantum subsystems that the system 100 utilizes may vary. For example, in some cases it may be convenient to include one or more readout device(s) 114 attached to one or more superconducting qubits, e.g., transmon, flux, gmon, xmon, or other qubits. In other cases, ion traps, photonic devices or superconducting cavities (e.g., with which states may be prepared without requiring qubits) may be used. Further examples of realizations of multi-level quantum subsystems include fluxmon qubits, silicon quantum dots or phosphorus impurity qubits.

Quantum circuits may be constructed and applied to the register of qubits included in the quantum system 110 via multiple control lines that are coupled to one or more control devices 112. Example control devices 112 that operate on the register of qubits can be used to implement quantum gates or quantum circuits having a plurality of quantum gates, e.g., Pauli gates, Hadamard gates, controlled-NOT (CNOT) gates, controlled-phase gates, T gates, multi-qubit quantum gates, coupler quantum gates, etc. The one or more control devices 112 may be configured to operate on the quantum system 110 through one or more respective control parameters (e.g., one or more physical control parameters). For example, in some implementations, the multi-level quantum subsystems may be superconducting qubits and the control devices 112 may be configured to provide control pulses to control lines to generate magnetic fields to adjust the frequency of the qubits.

The quantum hardware 102 may further include readout devices 114 (e.g., readout resonators). Measurement results 108 obtained via measurement devices may be provided to the classical processors 104 for processing and analyzing. In some implementations, the quantum hardware 102 may include a quantum circuit and the control device(s) 112 and readout devices(s) 114 may implement one or more quantum logic gates that operate on the quantum system 102 through physical control parameters (e.g., microwave pulses) that are sent through wires included in the quantum hardware 102. Further examples of control devices include arbitrary waveform generators, wherein a DAC (digital to analog converter) creates the signal.

The readout device(s) 114 may be configured to perform quantum measurements on the quantum system 110 and send measurement results 108 to the classical processors 104. In addition, the quantum hardware 102 may be configured to receive data specifying physical control qubit parameter values 106 from the classical processors 104. The quantum hardware 102 may use the received physical control qubit parameter values 106 to update the action of the control device(s) 112 and readout devices(s) 114 on the quantum system 110. For example, the quantum hardware 102 may receive data specifying new values representing voltage strengths of one or more DACs included in the control devices 112 and may update the action of the DACs on the quantum system 110 accordingly. The classical processors 104 may be configured to initialize the quantum system 110 in an initial quantum state, e.g., by sending data to the quantum hardware 102 specifying an initial set of parameters 106.

In some implementations, the readout device(s) 114 can take advantage of a difference in the impedance for the |0⟩ and |1⟩ states of an element of the quantum system, such as a qubit, to measure the state of the element (e.g., the qubit). For example, the resonance frequency of a readout resonator can take on different values when a qubit is in the state |0⟩ or the state |1⟩, due to the nonlinearity of the qubit. Therefore, a microwave pulse reflected from the readout device 114 carries an amplitude and phase shift that depend on the qubit state. In some implementations, a Purcell filter can be used in conjunction with the readout device(s) 114 to impede microwave propagation at the qubit frequency.

In some embodiments, the quantum system 110 can include a plurality of qubits 120 arranged, for instance, in a two-dimensional grid 122. For clarity, the two-dimensional grid 122 depicted in FIG. 1 includes 4×4 qubits, however in some implementations the system 110 may include a smaller or a larger number of qubits. In some embodiments, the multiple qubits 120 can interact with each other through multiple qubit couplers, e.g., qubit coupler 124. The qubit couplers can define nearest neighbor interactions between the multiple qubits 120. In some implementations, the strengths of the multiple qubit couplers are tunable parameters. In some cases, the multiple qubit couplers included in the quantum computing system 100 may be couplers with a fixed coupling strength.

In some implementations, the multiple qubits 120 may include data qubits, such as qubit 126 and measurement qubits, such as qubit 128. A data qubit is a qubit that participates in a computation being performed by the system 100. A measurement qubit is a qubit that may be used to determine an outcome of a computation performed by the data qubit. That is, during a computation an unknown state of the data qubit is transferred to the measurement qubit using a suitable physical operation and measured via a suitable measurement operation performed on the measurement qubit.

In some implementations, each qubit in the multiple qubits 120 can be operated using respective operating frequencies, such as an idling frequency and/or an interaction frequency and/or readout frequency and/or reset frequency. The operating frequencies can vary from qubit to qubit. For instance, each qubit may idle at a different operating frequency. The operating frequencies for the qubits 120 can be chosen before a computation is performed.

Some operating frequencies are better than other operating frequencies. One metric for assessing how good a particular operating frequency is for a particular qubit is energy relaxation time (T1) for the qubit at the frequency. Lower energy relaxation times can lead to larger quantum computational errors. In that regard, it can be desirable to operate qubits at frequencies where energy relaxation time is high.

Figure 2:
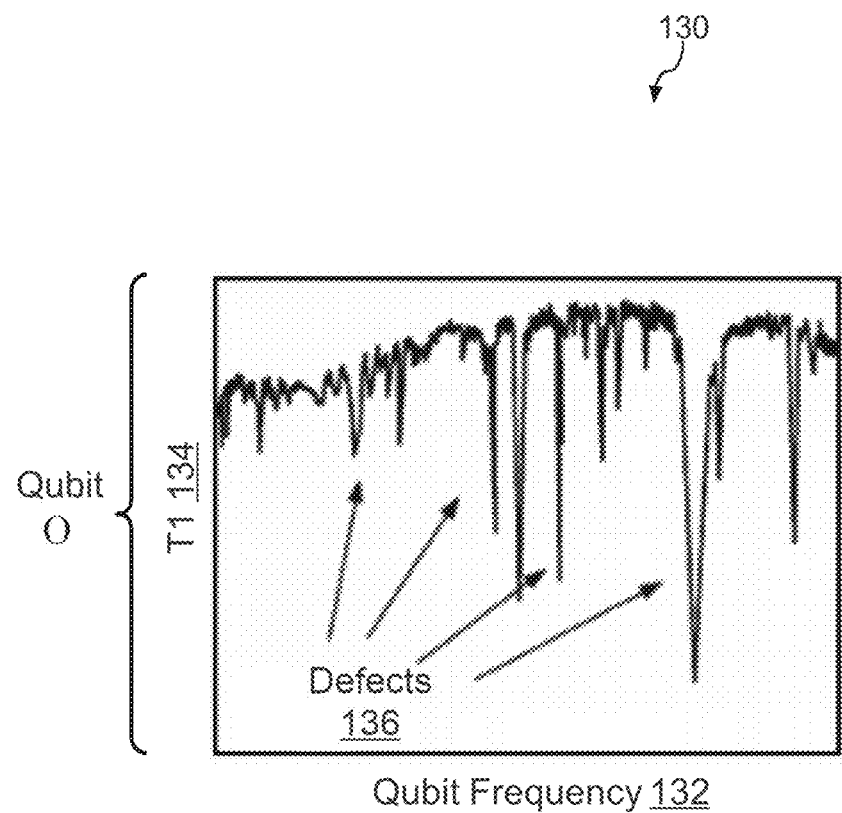
FIG. 2 depicts an example plot of qubit operating frequency versus energy relaxation time.

FIG. 2 depicts a plot 130 showing an example relationship between qubit frequency 132 and energy relaxation time (T1) 134. Ideally, energy relaxation time would vary smoothly as a function of qubit frequency. However, as shown in plot 130, in reality energy relaxation time can vary sporadically as a function of qubit frequency due to defects, as demonstrated by the downward spikes 136. The defect can be attributable to, for instance, a two-level system (TLS) defect transition frequency moving into resonance with the operating frequency.

Figure 3:
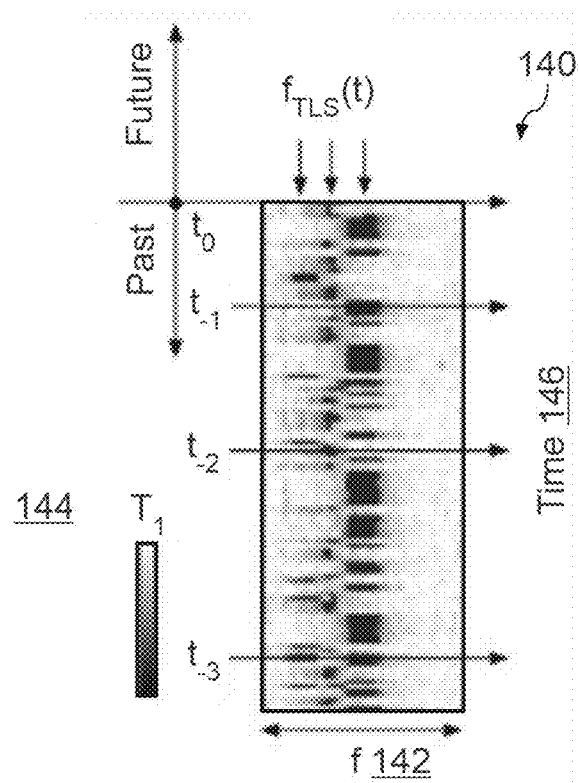
FIG. 3 depicts example telegraphic behavior over time of energy relaxation time for a qubit.

Energy relaxation time can also vary over time. In that regard, energy relaxation time is a temporal metric associated with the operating parameter of operating frequency for the qubit. For instance, FIG. 3 depicts a plot 140 of energy relaxation time 144 as a function of operating frequency 142 and time 146. The darker pixels in the plot 140 represent reductions in energy relaxation time that can be attributable to defects, such as collisions with TLS defects. As shown, the operating frequency at which the defects occur can vary over time and exhibit a time dependent behavior. In the example of FIG. 3, the defects move between multiple discrete frequencies. In this regard, in the example of FIG. 3, the time dependent defect is exhibiting a telegraphic behavior (e.g., the defects move between multiple discrete frequencies).

Figure 4:
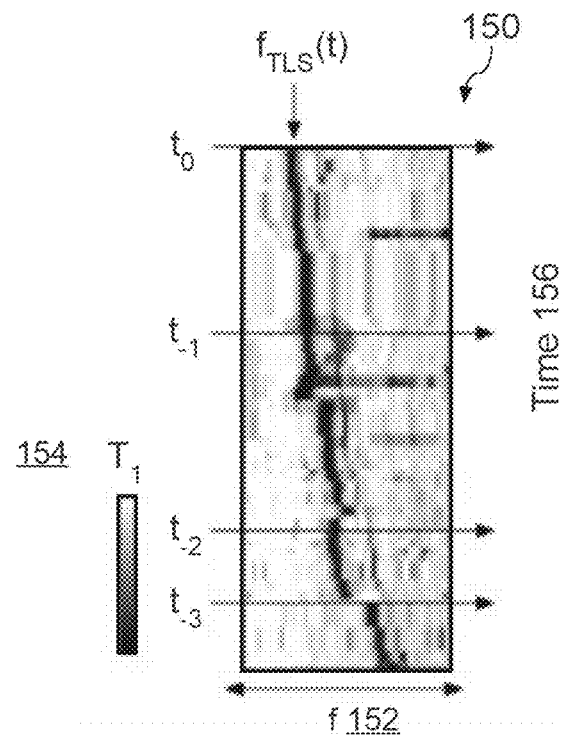
FIG. 4 depicts example diffusive behavior over time of energy relaxation time for a qubit.

As another example, FIG. 4 depicts a plot 150 of energy relaxation time 154 as a function of operating frequency 152 and time 156. The darker pixels in the plot 150 represent reductions in energy relaxation time that can be attributable to defects, such as TLS defects. As shown, the operating frequency at which the defects occur can vary over time and exhibit a time dependent behavior. In the example of FIG. 4, the defects drifts semi-continuously over time. In this regard, in the example of FIG. 4, the time dependent defect is exhibiting a diffusive behavior (e.g., the defect drifts over time).

As demonstrated by FIGS. 3 and 4, defects demonstrated by reductions in relaxation time can exhibit telegraphic behavior, diffusive behavior, or both telegraphic and diffusive behavior. Aspects of the present disclosure are directed to operating qubits in quantum devices to reduce error that can be attributable to the time dependent behavior of the defects, such as TLS defects.

Aspects of the present disclosure are directed to systems and methods for operating qubits in a manner that reduces the occurrence of time dependent defects (e.g., colliding with TLS defects) by determining operating parameters for the qubits that have reduced likelihood of resulting in an defect. For instance, systems and methods according to example aspects of the present disclosure can determine operating frequencies for qubits that avoid TLS depression of energy relaxation time.

In particular aspects, the operating parameters are determined based at least in part on past time data associated with the qubit. The past time data can be indicative of how a temporal metric (e.g., energy relaxation time) fluctuates over time. The past time data can be used to implement a constraint in an optimization problem that incorporates knowledge of the past time data to reduce the likelihood of selecting operating parameters that can result in a defect (e.g., colliding with a TLS defect) for the qubit.

Aspects of the present disclosure are discussed with reference to qubits (e.g., superconducting qubits) arranged in a two-dimensional grid for purposes of illustration and discussion. The operating parameter is qubit operating frequency. The temporal metric can be energy relaxation time. The defect can be a collision with a two-level-system defect.

Those of ordinary skill in the art, using the disclosures provided herein, will understand that aspects of the present disclosure can be used with any type of qubit and architecture without deviating from the scope of the present disclosure. For example, the qubits can be spin qubits in a spin-qubit quantum processor or ions in a trapped-ion quantum processor.

The operating parameter can be any tunable parameter without deviating from the scope of the present disclosure. For instance, in spin qubits, the operating parameter can be an external magnetic field.

Any time dependent behavior can be exhibited without deviating from the scope of the present disclosure. For instance, in the case of selecting operating frequencies for superconducting qubits, the time dependent behaviors can be used to implement single-qubit gates, multi-qubit gates, reset and/or readout. Dependencies between operating parameters can vary without deviating from the scope of the present disclosure. For example, a two-qubit gate frequency trajectory can depend on a single-qubit gate frequency trajectory.

Any temporal metric can be used without deviating from the scope of the present disclosure. For instance, the temporal metric can be based on single-qubit randomized benchmarking, single-qubit cross-entropy benchmarking, two-qubit randomized benchmarking, two-qubit cross-entropy benchmarking, dephasing time, or other suitable metric.

Any defect can be considered without deviating from the scope of the present disclosure. For instance, the defect can be attributable to a dynamic microwave mode or a nuclear spin.

Figure 5:
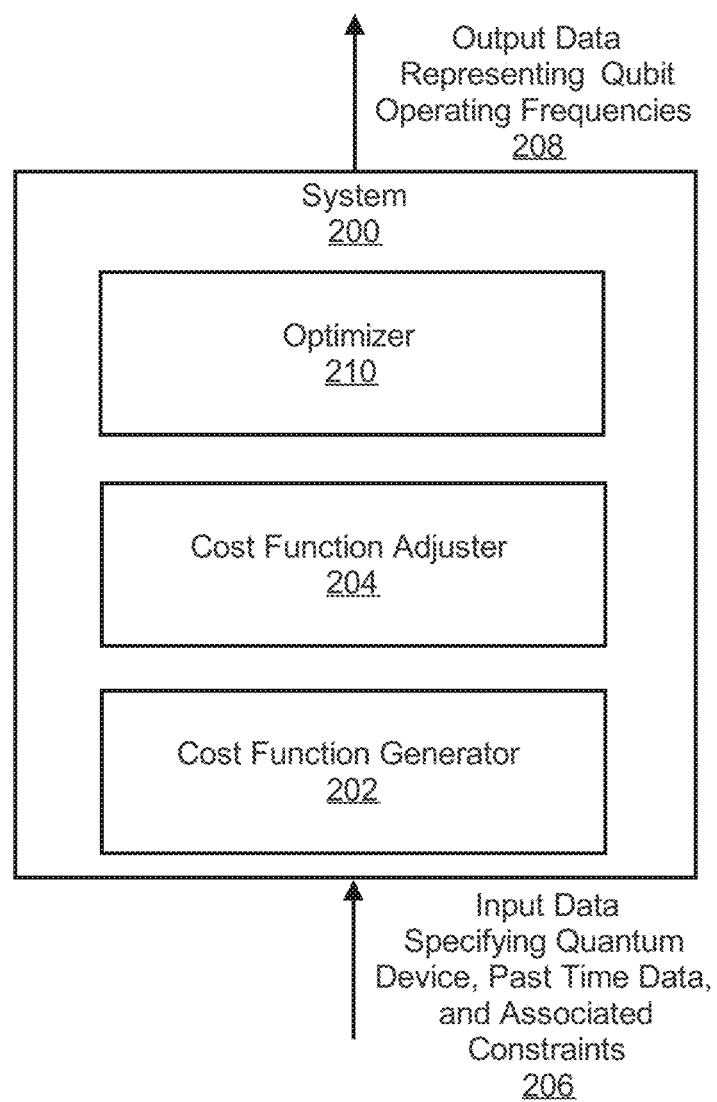
FIG. 5 depicts an example system for determining an operating parameter for each of one or more qubits in a quantum computing system according to example embodiments of the present disclosure.

FIG. 5 depicts an example system 200 for determining operating frequencies for one or more qubits according to example embodiments of the present disclosure. The system 200 can be an example of a system implemented as quantum or classical computer programs on one or more quantum or classical computers in one or more locations.

The system 200 receives as input data representing a quantum computing device that is to be used to perform computations, e.g., input data 206. For example, the input data 206 may include data representing properties of qubits included in the quantum computing device, such as the type of qubits included in the quantum computing device, the number of qubits included in the quantum computing device, the type of interactions between the qubits included in the quantum computing device, accessible frequency ranges of the qubits included in the quantum computing device, predicted and/or measured relaxation and/or coherence times of the qubits included in the quantum computing device.

The input data 206 may further include data representing optimization constraints that can be used to reduce the number of permissible qubit operating frequency configurations. The optimization constraints may be based on physics and engineering constraints of the quantum device (and its control system) and may vary. For example, optimization constraints may include predetermined constraints on differences in frequency between adjacent qubits, e.g., constraining qubit frequencies such that adjacent qubits idle X GHz apart from one another, predetermined constraints on relationships between different types of operating frequencies, e.g., constraining adjacent qubits to interact at the approximate mean of their idling frequencies, or predetermined constraints on acceptable frequency error tolerances.

According to particular aspects of the present disclosure, the optimization constraints can be based at least in part on past time data associated with a temporal metric (e.g., energy relaxation time) of one or more qubits in the quantum device. The past time data can demonstrate, for instance, telegraphic and/or diffusive behavior of defects of the qubits at varying operating parameters over time.

The system 200 includes a cost function generator 202. The cost function generator 202 can be configured to receive the input data 206 and define a first cost function that maps qubit operation frequency values to a cost corresponding to an operating state of the quantum device specified by the input data 206. The operating state of the quantum device may be defined as the set of qubit operation frequencies, e.g., idling and interaction frequencies, that are used by the quantum device during execution of a quantum algorithm.

According to example aspects of the present disclosure, the cost functions can include a plurality of weighted cost terms. At least one of the weighted cost terms can be associated with past time data associated with the temporal metric. Defining such a cost function and example cost function terms are described in detail below with reference to FIGS. 7-13.

The system can include a cost function adjuster 204. The cost function adjuster is configured to receive the input data representing one or more optimization constraints and apply the one or more constraints to the first cost function defined by the cost function generator 202 to define an adjusted cost function.

The system can include an optimizer 210. The optimizer 210 can be configured to adjust qubit operation frequency values to vary a cost according to the adjusted cost function defined by the cost function adjuster 204 such that an operating state of the quantum device specified by the input data 206 is improved, e.g., computations performed by the quantum computing device using the adjusted qubit operation frequency values are less error-prone. The optimizer 210 may be configured to implement various standard optimization routines as part of adjusting qubit operation frequency values to vary a cost according to the adjusted cost function. Example optimization routines are described below.

The system 200 generates as output data representing qubit operating frequencies, e.g., output data 208. The generated output data 208 may be used to operate the qubits/quantum device that includes the qubits and perform computations.

Figure 6:
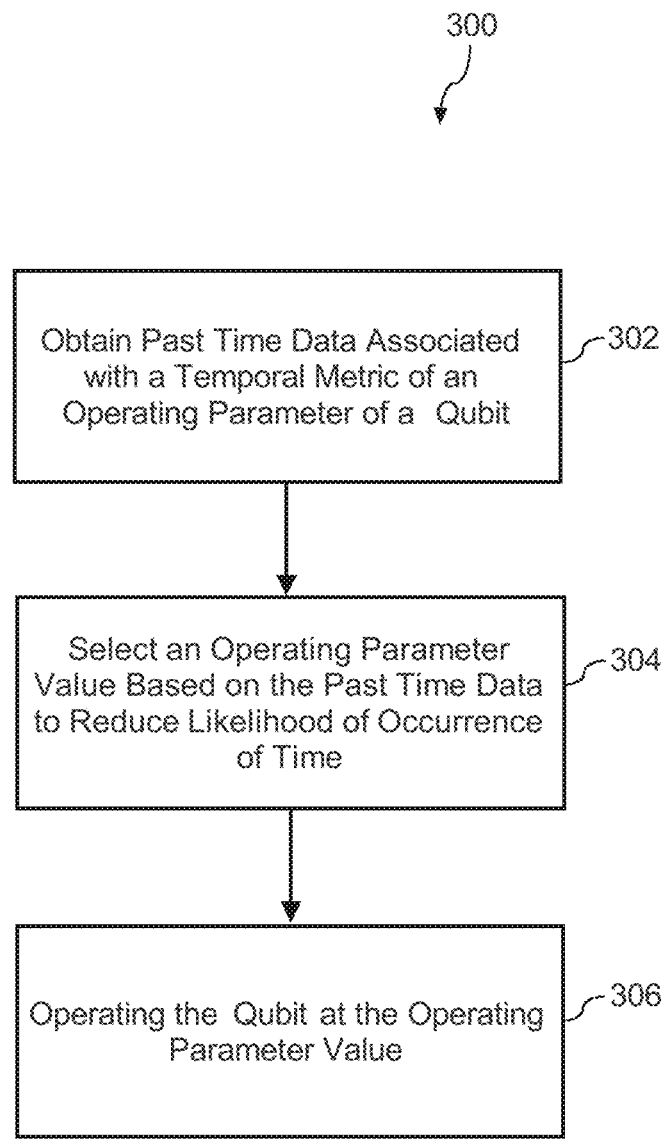
FIG. 6 depicts a flow diagram of an example method for determining an operating parameter for each of one or more qubits in a quantum computing system according to example embodiments of the present disclosure.

FIG. 6 depicts a flow diagram of an example method 300 for operating one or more qubits in a quantum computing system according to example embodiments of the present disclosure. The method 300 can be implemented using any suitable quantum and/or classical computing systems, such as the system described in FIG. 1. FIG. 6 depicts operations performed in a particular order for purposes of illustration and discussion. Those of ordinary skill in the art, using the disclosures provided herein, will understand that operations of any of the methods described herein can be expanded, include steps not illustrated, omitted, rearranged, and/or modified in various ways without deviating from the scope of the present disclosure.

At 302, the method 300 includes obtaining past time data associated with a temporal metric of an operating parameter of one or more qubits. In some embodiments, the past time data can be associated with energy relaxation time at different operating frequencies associated with the qubit. The operating frequencies can be, for instance, idling frequencies and/or interaction frequencies at which to operate nearest-neighbor interacting qubits in a network of interacting qubits. Examples of past time data associated with energy relaxation time are provided in FIGS. 3 and 4.

At 304, the method 300 includes selecting an operating parameter value based at least in part on the past time data associated with the temporal metric of the operating parameter to reduce the likelihood of occurrence of a time dependent defect (e.g., colliding with a TLS defect). The time dependent defect can exhibit a time dependent behavior (e.g., a telegraphic and/or diffusive behavior). In example embodiments, selecting an operating parameter can include constructing a cost function that implements constraints based on the past time data. An optimization operation can be performed using the cost function to select an operating parameter value for the operating parameter. Details concerning constructing the cost function and performing the optimization operation will be discussed in detail with reference to FIGS. 7-13

At 306, the method 300 includes operating the qubit in the quantum device at the selected operating parameter value. For instance, multiple qubits in a two-dimensional grid can be operated at operating frequencies determined for each of the qubits to perform a quantum operation (e.g., implement a quantum algorithm, implement a single-qubit gate, implement a multi-qubit gate, perform readout, etc.).

Figure 7:
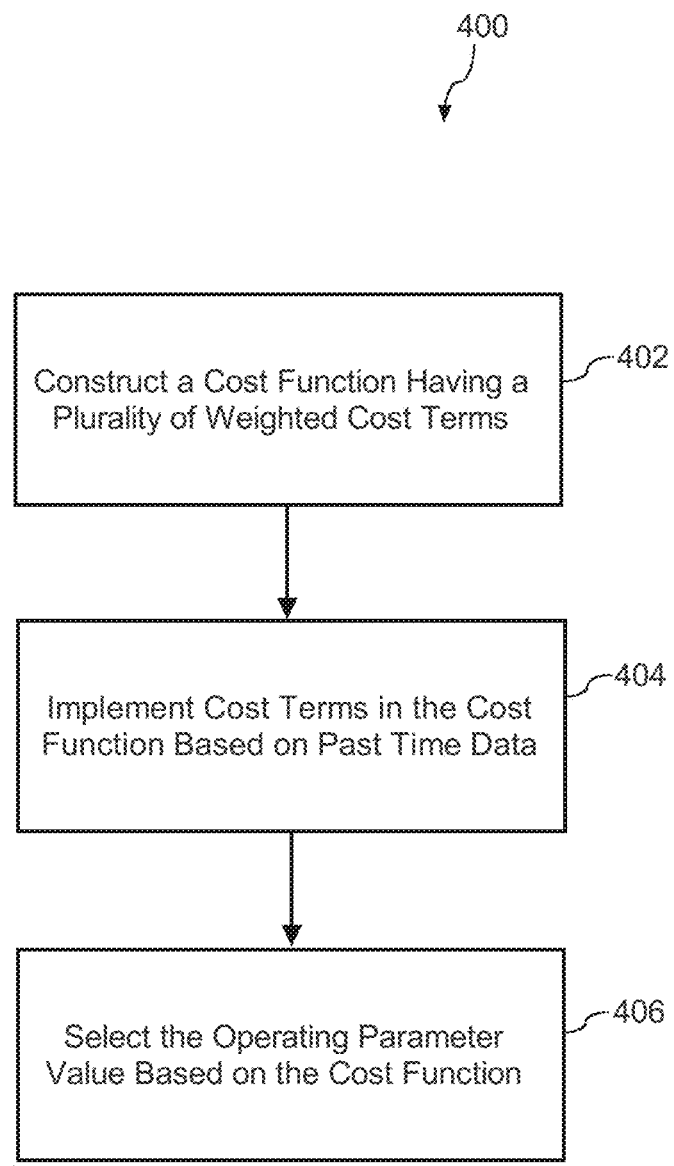
FIG. 7 depicts a flow diagram of an example method for selecting an operating parameter for each of one or more qubits in a quantum computing system according to example embodiments of the present disclosure.

With reference now to FIGS. 7-13, example implementations of selecting an operating parameter value based on past time data will be set forth. FIG. 7 depicts FIG. a flow diagram of an example method 400 for selecting an operating parameter value based at least in part on the past time data associated with the temporal metric of the operating parameter to reduce the likelihood of occurrence of a time dependent defect according to example embodiments of the present disclosure. The method 400 can be implemented using any suitable quantum and/or classical computing systems, such as the system described in FIG. 1. FIG. 7 depicts operations performed in a particular order for purposes of illustration and discussion. Those of ordinary skill in the art, using the disclosures provided herein, will understand that operations of any of the methods described herein can be expanded, include steps not illustrated, omitted, rearranged, and/or modified in various ways without deviating from the scope of the present disclosure.

At 402, the method includes constructing a cost function having a plurality of weighted cost terms. The cost function can map qubit operating parameter values (e.g., operating frequency values) to a cost (e.g., a real number) corresponding to a state of the quantum device. A lower cost can correspond to a better operating state for the quantum device (e.g., implement a quantum algorithm with reduced error rate). The cost function can have a plurality of weighted cost terms. The cost function terms and weights can be determined, for instance, based at least in part on data representing properties of qubits included in the quantum computing device.

At 404, the method includes implementing cost terms in the cost function based on the past time data. For instance, at least one of the weighted cost terms in the cost function can be based at least in part on the past time data. The weighted cost terms based on the past time data can be constructed considering the time dependent behavior of the defect. For instance, the weighted cost terms can be construed by taking into consideration whether the defect exhibits a telegraphic behavior, a diffusive behavior, or a combination of a telegraphic and diffusive behavior. Details concerning example cost functions are set forth below.

At 406, the method includes selecting an operating parameter value based on the cost function. For instance, an optimization process can be performed on the cost function to determine operating parameter values for one or more qubits. In some embodiments, operating parameters, such as operating frequencies can be determined for qubits arranged in a two-dimensional grid. Details concerning example optimizations processes are set forth below.

Figure 8:
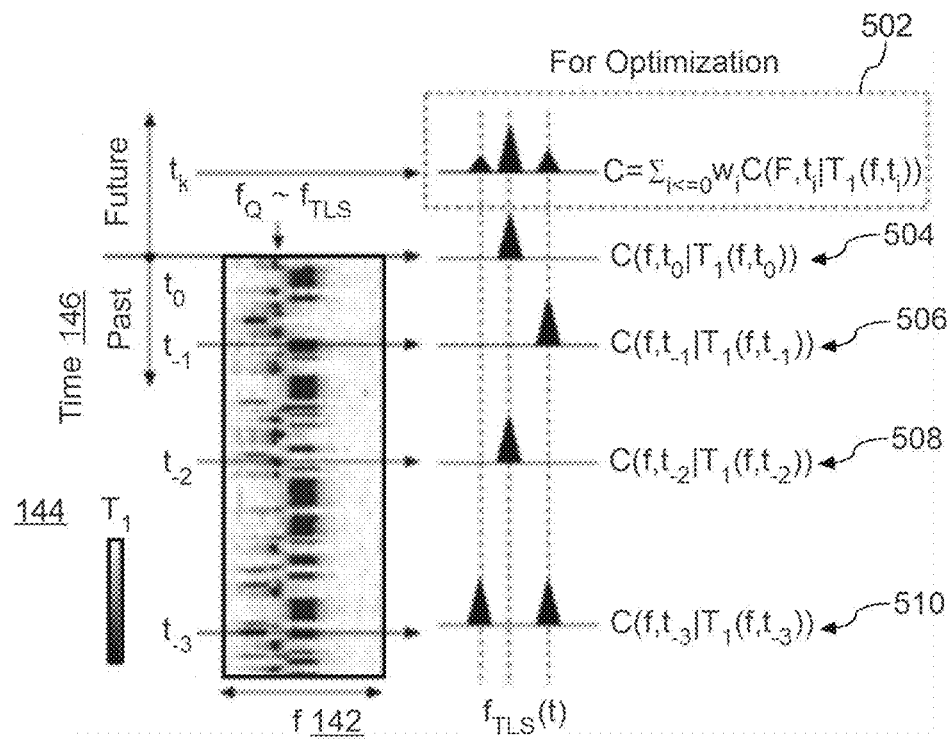
FIG. 8 depicts an example approach for generating a cost function to address telegraphic behavior of an operating parameter according to example embodiments of the present disclosure.

FIG. 8 depicts example construction of a cost function 502 having weighted cost terms for addressing defects exhibiting a telegraphic behavior. The weighted cost terms can be associated with past time data such that the cost function 502 embeds at least one past defect state into the cost function.

More particularly, telegraphic defect states can abruptly hop between multiple discrete defect states. An approach to reducing telegraphic defect states can be to build a cost function that is a weighted sum of current and past measured (e.g., not modelled) cost functions as shown in FIG. 8. More particularly, the cost function 502 can be a weighted sum of a current cost function 504 associated with time $t_0$ as well as past measured cost functions 506, 508, and 510 associated with times $t_{-1}$, $t_{-2}$, and $t_{-3}$ respectively. In this manner, multiple past defect states can be embedded into the cost function. By embedding past defect states into the cost function, the cost function can implicitly anticipate the defect state returning to a past measured defect state.

An example process for constructing the cost function to address telegraphic defect states is provided below:

Take T1 (f, t0) data at the current time t0.
Pull historical T1 (f, ti) data for times ti<t0.
Construct a weighted relaxation cost function as follows:

$$C(f) = \Sigma i \leq 0 \ wi \ C(f, ti | T1(f, ti)) \text{ such that } \Sigma i \ wi = 1$$

The weights wi can be chosen by an arbitrary function that may depend on, for instance, the qubit, the defect (e.g. TLS), and quantum processor architecture. In some embodiments, the weights wi can be chosen based on an arbitrary time constant Tc. For instance the weights can be chosen via a Gaussian function as follows: $wi \propto \exp[-((t0-ti)/Tc)^2]$. As another example, the weights can be chosen via a decaying exponential function as follows: $wi \propto \exp[-(t0-ti)/Tc]$.

Figure 9:
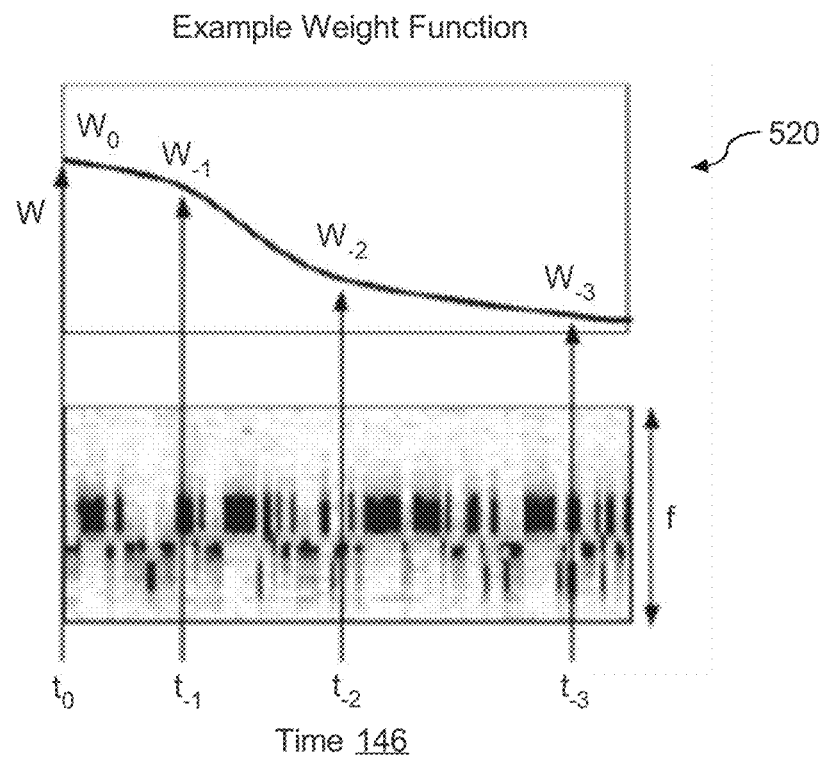
FIG. 9 depicts example generation of weighted cost terms according to example embodiments of the present disclosure.

In some embodiments, the weights can be chosen according to a weight function that suppresses weights as the weights are associated with times further from the current time. The weight function can be an arbitrary function and/or can be dependent on the qubit architecture and type of defect being mitigated. FIG. 9 depicts an example weight function 520 for assigning weights based on deviation of time from the current time. In some examples, the weight function weights a cost term associated with less recent past time data less heavily than a cost term associated with more recent past time data.

Figure 10:
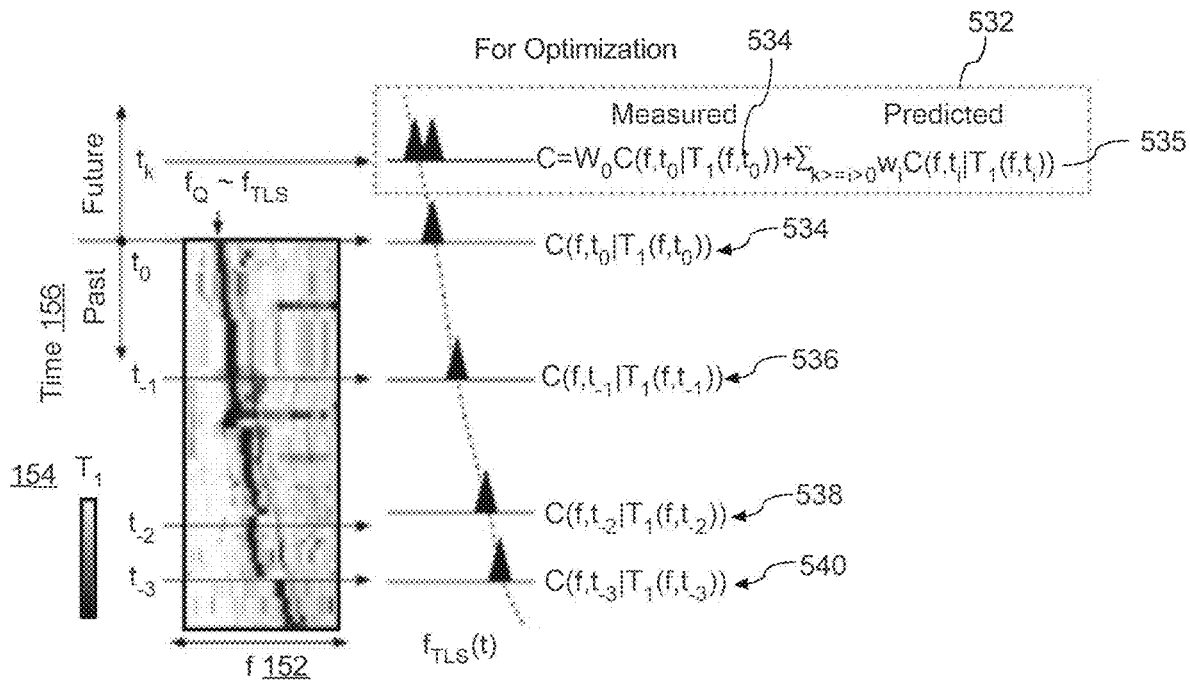
FIG. 10 depicts an example approach for generating a cost function to address diffusive behavior of an operating parameter according to example embodiments of the present disclosure.

FIG. 10 depicts example construction of a cost function 532 having weighted cost terms for addressing defects exhibiting a diffusive behavior. The cost function 532 can include one or more weighted cost terms to embed a future predicted defect state into the cost function. The future predicted defect state can be determined based at least in part on the past time data (e.g., using a polynomial-fit of past time data, using a machine learning algorithm, etc.).

Diffusive defect states can have smoothly varying operating parameters. An approach to mitigating diffusive defect states can be to build a cost function that is a weighted sum of the current cost function and one or more predicted cost functions for the future as shown in FIG. 10. The predicted cost functions can be generated by extrapolating defect states based on past time data associated with the temporal metric via, for instance, a simple polynomial fit or using a neural network. More particularly, the cost function 532 can be a weighted sum of a current cost function 534 associated with time t0 and future predicted cost functions 535 at tk≥ti>t0. Future predictions may be generated by extrapolating $f_{TLS}$ via a polynomial fit, a machine learning algorithm, or some other method. The future predicted cost functions can be determined from past measured time data (e.g., cost functions 536, 538, and 540) at, for instance, times $t_{-1}$, $t_{-2}$, and $t_{-3}$ respectively. By embedding future predictions, the cost function 532 anticipates that the TLS defect can move to previously unvisited frequencies. Embedding future predicted cost terms into the cost function can also be used to address telegraphic behavior of defect states, with an appropriate extrapolation model.

Figure 11:
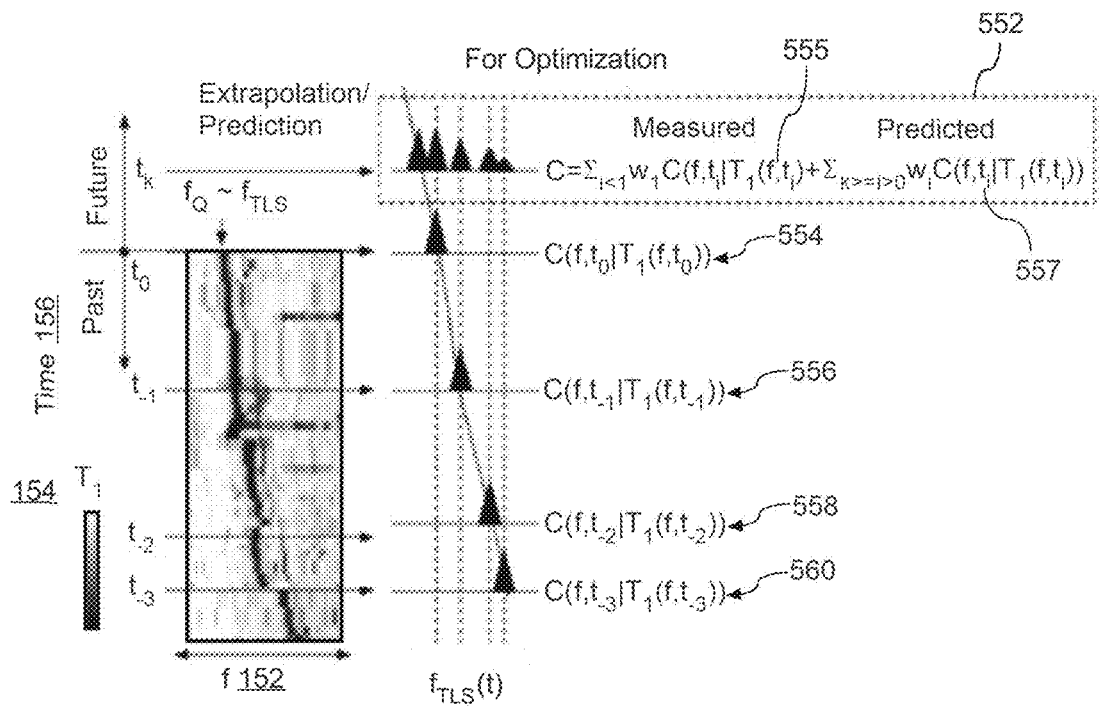
FIG. 11 depicts an example approach for generating a cost function to address diffusive and telegraphic behavior of an operating parameter according to example embodiments of the present disclosure.

In some embodiments, as shown in FIG. 11, a cost function can be constructed that includes a current cost function, one or more predicted cost functions, and one or more past measured cost functions. This cost function can be appropriate, for instance, for addressing defect states that exhibit both telegraphic and diffusive behavior. For instance, as shown in FIG. 11, the cost function 552 can be a weighted sum of current and past measured cost functions 555 and future predicted cost functions 557 at tk≥ti>t0. The cost functions 555 can be associated with cost functions 554 for the current time t0 as well as past measured cost functions 556, 558, and 560 associated with times $t_{-1}$, $t_{-2}$, and $t_{-3}$ respectively. The future predicted cost functions can be determined from past measured time data (e.g., cost functions 536, 538, and 540) at, for instance, times $t_{-1}$, $t_{-2}$, and $t_{-3}$ respectively.

An example process for constructing the cost function under the approach in FIG. 11 is provided below:

Take T1 (f, t0) data at the current time t0.
Pull historical T1 (f, ti) data for times ti<t0.
Predict future $\check{T}1(f, ti)$ data for times tk≥ti>t0 (e.g, using extrapolation, machine learning, etc.)
Construct a weighted relaxation cost function as follows:

$$C(f) = \Sigma i \leq 0 \; wi \; C(f, ti|T1(f, ti)) + \Sigma k \geq i > 0 \; wi \; \hat{C}(f, ti|\check{T}1(f, ti)) \text{ such that } \Sigma i \; wi = 1$$

The weights wi can be chosen by an arbitrary function that may depend on, for instance, the qubit, the defect (e.g. TLS defect), and quantum processor architecture. In some embodiments, the weights wi can be chosen based on an arbitrary time constant Tc. For instance the weights can be chosen via a Gaussian function as follows: $wi \propto \exp[-((t0-ti)/Tc)^2]$. As another example, the weights can be chosen via a decaying exponential function as follows: $wi \propto \exp[-(t0-ti)/Tc]$. In some embodiments, the weights can be chosen according to a weight function that suppresses weights as the weights are associated with times further from the current time (e.g., as shown in FIG. 9).

Any suitable method can be used to generate $\check{T}1(f, ti)$ and/or $\hat{C}(f, ti|\check{T}1(f, ti))$ cost-function predictions. One approach is to fit a past time data trajectory to some function like a polynomial and then to use that polynomial to extrapolate where the defect may be at a future time. Another approach is to use a machine learning (ML) model such as a neural network to predict a defect's future position and/or a future $\check{T}1(f, ti)$ spectrum. Given sufficient model capacity, this approach may be useful for mitigating diffusive and telegraphic defects.

Figure 12:
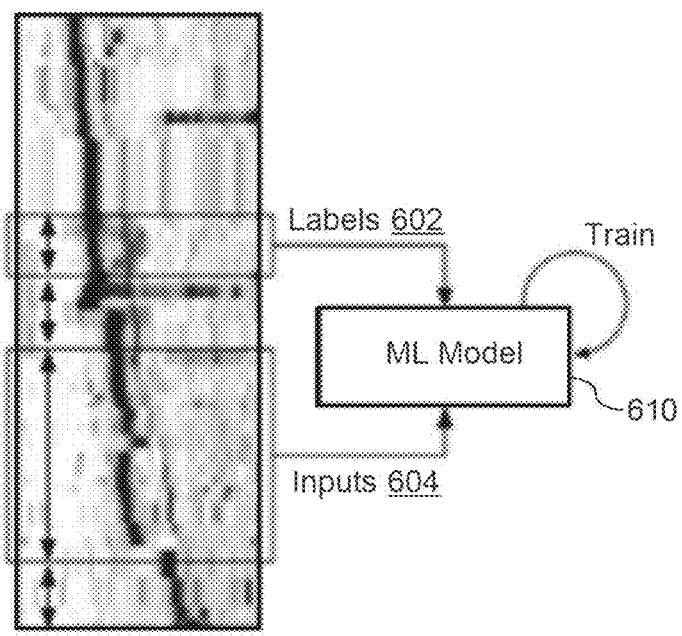
FIG. 12 depicts example training of a machine learned model to predict future defect states according to example embodiments of the present disclosure.

More particularly, FIG. 12 illustrates one example embodiment for training a machine learning (ML) model 610 within the supervised learning framework. For example, the model 610 may be a polynomial regression model or an arbitrary neural network model. The inputs 604 may be some fraction of past time data and time. The labels 602 may be some fraction of data that is delayed by some arbitrary time with respect to the inputs 604.

Figure 13:
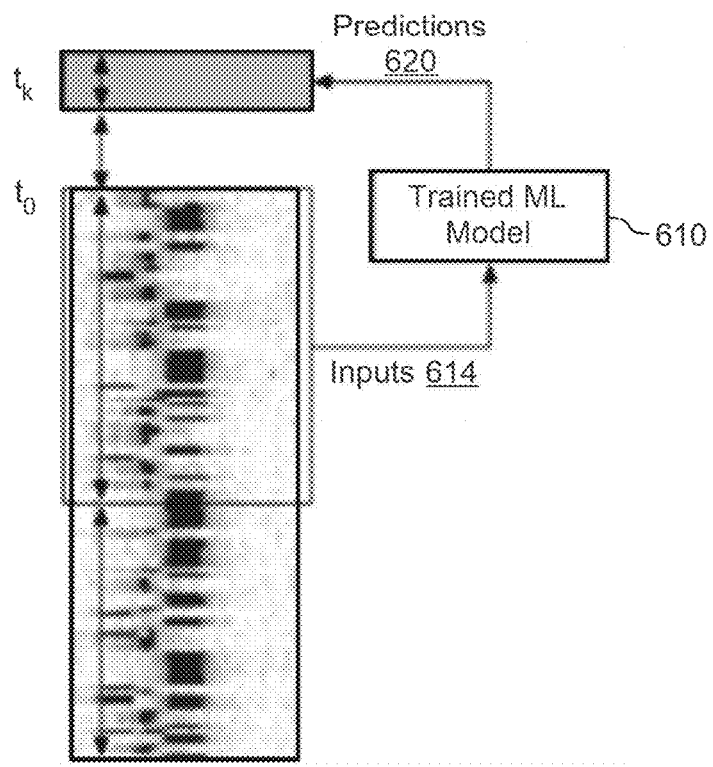
FIG. 13 depicts example application of a machine learned model to predict future defect states according to example embodiments of the present disclosure.

FIG. 13 illustrates one example of how the trained ML model 610 may be used according to example embodiments of the present disclosure. At some current time t0, past time data may be fed as inputs 614 into the model 610. The model 610 can generate a predicted defect location and/or a predicted $\check{T}1(f, ti)$ spectrum and/or $\hat{C}(f, ti|\check{T}1(f, ti))$ cost-function. This information can then be used to construct a cost function with weighted cost terms for future predicted states as discussed above. Details concerning an example computing environment that can be used to train and/or apply the ML model 610 will be discussed with reference to FIG. 14.

Additional details concerning example optimization processes and example cost functions and cost terms are set forth below. As discussed above, the example cost terms can be associated with a current time, a past measured time and/or a future predicted time. For purposes of illustration and discussion, example optimization processes and example cost terms are described for determining idling and interaction frequencies at which to operating nearest-neighbor interacting qubits in a superconducting quantum computing device, however the techniques described below may equally be applied for determining operating parameters for any qubit architectures (e.g., quantum dots, defect spins, atoms) that comprise a network of interacting qubits (e.g., not limited to nearest neighbor interactions).

More particularly, in some implementations (e.g., in quantum computing devices including a two-dimensional grid of interacting superconducting qubits), the operating parameters can include idling frequencies and interaction frequencies. An idling frequency is a frequency at which a qubit is operated when it is not involved in a computation or when it is being used to perform single qubit gates. A corresponding idling qubit frequency may be specified for each qubit in the quantum computing device. An interaction frequency is a common frequency at which adjacent qubits in the two-dimensional grid is operated at when performing two-qubit gates. A corresponding interaction frequency may be specified for each pair of adjacent qubits.

A cost function can be defined that maps qubit operation frequency values (e.g., all qubit idling frequencies, as described below) to a cost (e.g., a real number) corresponding to an operating state of the quantum device. For example, a lower cost may correspond to a better operating state for the quantum device, e.g., an operating state that executes an arbitrary quantum algorithm with lower error rates compared to other operating states. In some cases, a better operating state may depend on the quantum algorithm. The systems and methods according to example aspects of the present disclosure may account for such dependencies by weighing individual cost terms differently in different optimization routines.

The cost function includes a weighted sum of cost terms corresponding to respective costs. The type of cost terms included in the first cost function may vary and are dependent on the type of quantum computing device. Certain cost terms can be based on past time data and/or future predicted states as discussed above. As one example, the cost function may include an idling cost term for current time, past measured time, and/or future predicted time that penalizes undesirable properties of qubit idling frequencies. The idling cost term may penalize low qubit relaxation time (T1) idling frequencies. Other cost terms can be used in the cost function without deviating from the scope of the present disclosure.

Figure 14:
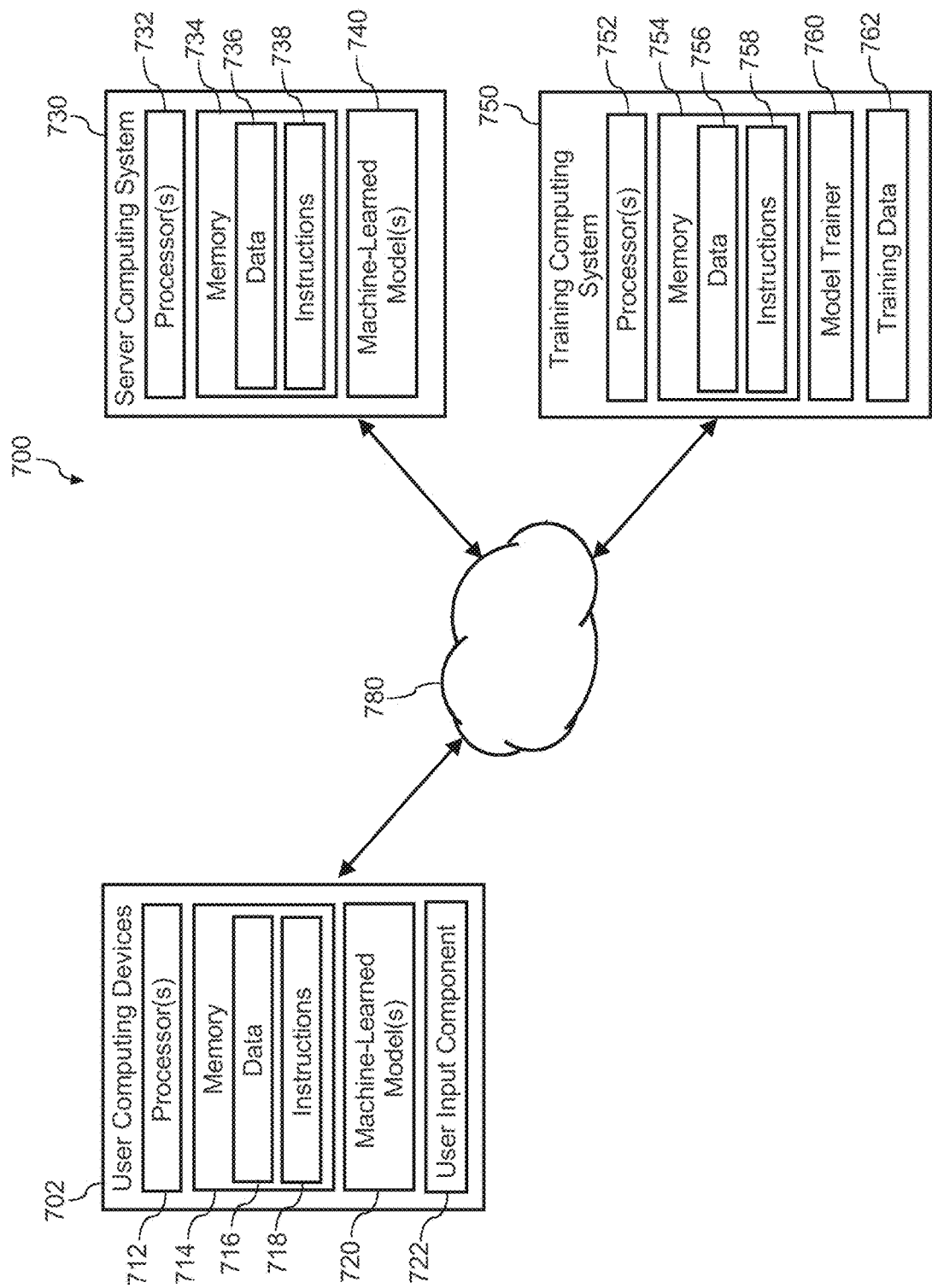
FIG. 14 depicts an example classical computing environment that can be used to implement aspects of the present disclosure according to example embodiments of the present disclosure.

FIG. 14 depicts a block diagram of an example computing system 700 that determines operating parameter values for one or qubits according to example embodiments of the present disclosure. The system 700 includes a user computing device 702, a server computing system 730, and a training computing system 750 that are communicatively coupled over a network 780.

The user computing device 702 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 702 includes one or more processors 712 and a memory 714. The one or more processors 712 can be any suitable processing device (e.g., a processor core, a microprocessor, an ASIC, an FPGA, a controller, a microcontroller, etc.) and can be one processor or a plurality of processors that are operatively connected. The memory 714 can include one or more non-transitory computer-readable storage media, such as RAM, ROM, EEPROM, EPROM, flash memory devices, magnetic disks, etc., and combinations thereof. The memory 714 can store data 716 and instructions 718 which are executed by the processor 712 to cause the user computing device 702 to perform operations.

In some implementations, the user computing device 702 can store or include one or more predictive models 720. For example, the predictive models 720 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more predictive models 720 can be received from the server computing system 730 over network 780, stored in the user computing device memory 714, and then used or otherwise implemented by the one or more processors 712. In some implementations, the user computing device 702 can implement multiple parallel instances of a single predictive model 720.

More particularly, the predictive model 720 can be used to generate cost terms associated with future predicted defect states based on past time data. The future predicted defect states can be accounted for in determining operating parameter values for operating one or more qubits in a quantum device.

Additionally, or alternatively, one or more predictive models 740 can be included in or otherwise stored and implemented by the server computing system 730 that communicates with the user computing device 702 according to a client-server relationship. Thus, one or more models 720 can be stored and implemented at the user computing device 702 and/or one or more models 740 can be stored and implemented at the server computing system 730.

The user computing device 702 can also include one or more user input components 722 that receives user input. For example, the user input component 722 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 730 includes one or more processors 732 and a memory 734. The one or more processors 732 can be any suitable processing device (e.g., a processor core, a microprocessor, an ASIC, an FPGA, a controller, a microcontroller, etc.) and can be one processor or a plurality of processors that are operatively connected. The memory 734 can include one or more non-transitory computer-readable storage media, such as RAM, ROM, EEPROM, EPROM, flash memory devices, magnetic disks, etc., and combinations thereof. The memory 734 can store data 736 and instructions 738 which are executed by the processor 732 to cause the server computing system 730 to perform operations.

In some implementations, the server computing system 730 includes or is otherwise implemented by one or more server computing devices. In instances in which the server computing system 730 includes plural server computing devices, such server computing devices can operate according to sequential computing architectures, parallel computing architectures, or some combination thereof.

As described above, the server computing system 730 can store or otherwise include one or more predictive models 740. For example, the models 740 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The user computing device 702 and/or the server computing system 730 can train the models 720 and/or 740 via interaction with the training computing system 750 that is communicatively coupled over the network 780. The training computing system 750 can be separate from the server computing system 730 or can be a portion of the server computing system 730.

The training computing system 750 includes one or more processors 752 and a memory 754. The one or more processors 752 can be any suitable processing device (e.g., a processor core, a microprocessor, an ASIC, an FPGA, a controller, a microcontroller, etc.) and can be one processor or a plurality of processors that are operatively connected. The memory 754 can include one or more non-transitory computer-readable storage media, such as RAM, ROM, EEPROM, EPROM, flash memory devices, magnetic disks, etc., and combinations thereof. The memory 754 can store data 756 and instructions 758 which are executed by the processor 752 to cause the training computing system 750 to perform operations. In some implementations, the training computing system 750 includes or is otherwise implemented by one or more server computing devices.

The training computing system 750 can include a model trainer 760 that trains the machine-learned models 720 and/or 740 stored at the user computing device 702 and/or the server computing system 730 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 760 can perform a number of generalization techniques (e.g., weight decays, dropouts, etc.) to improve the generalization capability of the models being trained.

In particular, the model trainer 760 can train the predictive models 720 and/or 740 based on a set of training data 762. The training data 762 can include, for example, past time data associated with a temporal metric (e.g., energy relaxation time) and/or presence of defect (e.g., TLS defects).

The model trainer 760 includes computer logic utilized to provide desired functionality. The model trainer 760 can be implemented in hardware, firmware, and/or software controlling a general purpose processor. For example, in some implementations, the model trainer 760 includes program files stored on a storage device, loaded into a memory and executed by one or more processors. In other implementations, the model trainer 760 includes one or more sets of computer-executable instructions that are stored in a tangible computer-readable storage medium such as RAM, hard disk, or optical or magnetic media.

The network 780 can be any type of communications network, such as a local area network (e.g., intranet), wide area network (e.g., Internet), or some combination thereof and can include any number of wired or wireless links. In general, communication over the network 780 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 14 illustrates one example computing system that can be used to implement the present disclosure. Other computing systems can be used as well. For example, in some implementations, the user computing device 702 can include the model trainer 760 and the training dataset 762. In such implementations, the models 720 can be both trained and used locally at the user computing device 702.

Implementations of the digital, classical, and/or quantum subject matter and the digital functional operations and quantum operations described in this specification can be implemented in digital electronic circuitry, suitable quantum circuitry or, more generally, quantum computational systems, in tangibly-implemented digital and/or quantum computer software or firmware, in digital and/or quantum computer hardware, including the structures disclosed in this specification and their structural equivalents, or in combinations of one or more of them. The term "quantum computing systems" may include, but is not limited to, quantum computers/computing systems, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits/qubit structures, or a combination of one or more of them. Alternatively or in addition, the program instructions can be encoded on an artificially-generated propagated signal that is capable of encoding digital and/or quantum information (e.g., a machine-generated electrical, optical, or electromagnetic signal) that is generated to encode digital and/or quantum information for transmission to suitable receiver apparatus for execution by a data processing apparatus.

The terms quantum information and quantum data refer to information or data that is carried by, held, or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states (e.g., qudits) are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, or multiple digital and quantum processors or computers, and combinations thereof. The apparatus can also be, or further include, special purpose logic circuitry, e.g., an FPGA (field programmable gate array), or an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital or classical computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL, Quipper, Cirq, etc. . . .

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers or processors to be "configured to" or "operable to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum microprocessors or both, or any other kind of central digital and/or quantum processing unit. Generally, a central digital and/or quantum processing unit will receive instructions and digital and/or quantum data from a read-only memory, or a random access memory, or quantum systems suitable for transmitting quantum data, e.g. photons, or combinations thereof.

Some example elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, or optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more tangible, non-transitory machine-readable storage media, and that are executable on one or more digital and/or quantum processing devices. The systems described in this specification, or portions of them, can each be implemented as an apparatus, method, or electronic system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of operating a qubit structure in a quantum device, the method comprising:
   obtaining past time data associated with a temporal metric of an operating parameter of a qubit structure in a quantum device;
   selecting an operating parameter value based at least in part on the past time data associated with the temporal metric of the operating parameter and based at least in part on a relationship between the operating parameter value and a likelihood of occurrence of a time dependent defect, the time dependent defect exhibiting a time dependent behavior;
   operating the qubit structure in the quantum device at the operating parameter value.

2. The method of claim 1, wherein the temporal metric of the operating parameter is an energy relaxation time of the operating parameter.

3. The method of claim 1, wherein the operating parameter of the qubit structure is an operating frequency.

4. The method of claim 1, wherein the time dependent defect is a collision with a two-level system defect.

5. The method of claim 1, wherein the qubit structure is a superconducting qubit structure.

6. The method of claim 1, wherein selecting the operating parameter value comprises:
   constructing a cost function having a plurality of weighted cost terms, at least one of the weighted cost terms associated with past time data; and
   selecting the operating parameter value based at least in part on the cost function.

7. The method of claim 1, wherein the time dependent defect exhibits a telegraphic behavior.

8. The method of claim 7, wherein selecting the operating parameter value comprises:
   constructing a cost function having a plurality of weighted cost terms, at least one of the weighted cost terms associated with past time data such that the cost function embeds a past defect state into the cost function, and
   selecting the operating parameter value based at least in part on the cost function.

9. The method of claim 1, wherein the time dependent defect exhibits a diffusive behavior.

10. The method of claim 9, wherein selecting the operating parameter value comprises:
    constructing a cost function having a plurality of weighted cost terms, at least one of the weighted cost terms associated with past time data such that the cost function embeds a future predicted defect state into the cost function, and
    selecting the operating parameter value based at least in part on the constructed cost function.

11. The method of claim 10, wherein the future predicted defect state is determined at least in part on an extrapolation of the past time data.

12. The method of claim 10, wherein the future predicted defect state is determined at least in part on a machine-learned model.

13. The method of claim 1, wherein selecting the operating parameter value comprises:
    constructing a cost function having a plurality of weighted cost terms, the weighted cost terms comprising a first cost term associated with past time data such that the cost function embeds a future predicted defect state into the cost function, the weighted cost terms comprising one or more second cost terms associated with past time data such that it embeds a past defect state into the cost function; and
    selecting the operating parameter value based at least in part on the constructed cost function.

14. The method of claim 1, wherein the cost function weights a cost term associated with less recent past time data less heavily than a cost term associated with more recent past time data.

15. A quantum computing system comprising:
    a plurality of superconducting qubit structures, each qubit structure configured to be operated using an operating frequency, each operating frequency associated with an energy relaxation time;
    one or more processors configured to execute computer-readable instructions stored in one or more memory devices to perform operations, the operations comprising:
    determining a set of operating frequencies for the plurality of superconducting qubit structures based at least in part on past time data associated with energy relaxation time for each operating frequency and based at least in part on a relationship between the set of operating frequencies and a likelihood of occurrence of a two level state defect;
    operating the plurality of superconducting qubit structures at the set of operating frequencies.

16. The quantum computing system of claim 15, wherein the operating frequency comprises an idling frequency, an interaction frequency, a readout frequency, or a reset frequency.

17. The quantum computing system of claim 15, wherein neighboring qubit structures are operable to interact.

18. A computer-readable storage medium comprising instructions that are executable by a classical or quantum processing device and upon such execution cause the processing device to perform operations comprising:
    obtaining past time data associated with a temporal metric of an operating parameter of a qubit structure in a quantum device;
    selecting an operating parameter value based at least in part on the past time data associated with the temporal metric of the operating parameter and based at least in part on a relationship between the operating parameter value and a likelihood of occurrence of a time dependent defect, the time dependent defect exhibiting a time dependent behavior;
    operating the qubit structure in the quantum device at the operating parameter value.

19. The computer-readable storage medium of claim 18, wherein the operation of selecting an operating parameter value comprises:

constructing a cost function having a plurality of weighted cost terms, at least one of the weighted cost terms associated with past time data; and selecting the operating parameter value based at least in part on the cost function.

20. The computer-readable storage medium of claim 18, wherein the operation of selecting an operating parameter value comprises:

constructing a cost function having a plurality of weighted cost terms, the weighted cost terms comprising a first cost term associated with past time data such that the cost function embeds a future predicted defect state into the cost function, the weighted cost terms comprising one or more second cost terms associated with past time data such that it embeds a past defect state into the cost function; and selecting the operating parameter value based at least in part on the cost function.

* * * * *